United States Patent
Schirmer et al.

(10) Patent No.: US 6,752,093 B2
(45) Date of Patent: Jun. 22, 2004

(54) METHOD FOR OPERATING A REFUSE INCINERATION PLANT

(75) Inventors: Alfons Schirmer, Zürich (CH); Josef Mercx, Baden (CH)

(73) Assignee: Von Roll Umwelttechnik AG (CH)

( * ) Notice: Subject to any disclaimer, the term of this patent is extended or adjusted under 35 U.S.C. 154(b) by 0 days.

(21) Appl. No.: 10/203,340

(22) PCT Filed: Oct. 24, 2001

(86) PCT No.: PCT/CH01/00630

§ 371 (c)(1),
(2), (4) Date: Aug. 8, 2002

(87) PCT Pub. No.: WO02/46661

PCT Pub. Date: Jun. 13, 2002

(65) Prior Publication Data

US 2003/0010269 A1 Jan. 16, 2003

(30) Foreign Application Priority Data

Dec. 8, 2000 (CH) .............................. 2398/00

(51) Int. Cl.$^7$ .............................. F23G 5/00; F23N 5/18; F23K 3/00
(52) U.S. Cl. ...................... 110/346; 110/185; 110/188; 110/101 C; 110/101 CF
(58) Field of Search ................................ 110/185, 186, 110/188, 101 C, 101 CF, 346

(56) References Cited

U.S. PATENT DOCUMENTS

| | | | | |
|---|---|---|---|---|
| 3,583,369 A | * | 6/1971 | Petry | .............................. 122/2 |
| 4,981,087 A | * | 1/1991 | Martin | ........................ 110/186 |
| 5,052,310 A | * | 10/1991 | Goff et al. | ................... 110/234 |
| 5,230,293 A | | 7/1993 | Schirmer | |
| 5,398,623 A | * | 3/1995 | Lautehschlager et al. | ... 110/346 |
| 6,022,387 A | | 2/2000 | Asplund | |

FOREIGN PATENT DOCUMENTS

| | | |
|---|---|---|
| EP | 499 976 | 8/1992 |
| EP | 766 042 | 4/1997 |
| EP | 1 048 900 | 11/2000 |
| WO | WO 00/75569 | 12/2000 |
| WO | WO 01/25690 | 4/2001 |
| WO | WO 01/25691 | 4/2001 |
| WO | WO 01/65178 | 9/2001 |

* cited by examiner

Primary Examiner—Kenneth B. Rinehart
(74) Attorney, Agent, or Firm—Ostrolenk, Faber, Gerb & Soffen, LLP

(57) ABSTRACT

A method for operating a refuse incineration plant and to a regulating system, in which, after the fire has been fanned, the generation of heat is made more uniform by regulating at least one of the following operating parameters: refuse metering; residence time on a grate; quantitative supply of primary air; and quantitative preheating of primary air. To match the operating parameters to a varying calorific value of the refuse, the calorific value of the refuse is recorded as well as the standard regulating variables and is used to adapt the regulating device. The measure used for the calorific value is, for example, the moisture content of the flue gas generated during the incineration. Consequently, there is no need for the operator to estimate the calorific value and manually adapt the operating parameters accordingly.

19 Claims, 4 Drawing Sheets

METHOD FOR OPERATING A REFUSE INCINERATION PLANT

PRIORITY CLAIM

This is a U.S. national stage of application No. PCT/CH01/00630, filed on Oct. 24, 2001. Priority is claimed on that application:

Country: Switzerland, Application No.: 2000 2398/00, Filed: Dec. 8, 2000.

The invention relates to a method for operating a refuse incineration plant. The method further relates to a regulating system for regulating at least one of the operating parameters of a refuse incineration plant, and to a refuse incineration plant having a regulating system of this type.

The operation and in particular the uniform generation of heat in oil-fired or coal-fired power plants does not cause problems. This uniform generation of heat is achieved by uniform metering of the fuel, the quality of which is constant and known. The main aim of refuse incineration plants too is to keep the heat output constant. In addition, the flue gas has to comply with certain statutory regulations with regard to quality and quantity. The heat output cannot be controlled simply by metering the refuse supplied, since the calorific value of the refuse, on account of its differing composition and the varying water content, may fluctuate considerably. Accordingly, it is already difficult to maintain a constant quantity of heat. Additional optimization of the other parameters causes even more problems.

EP-B-0 499 976 has disclosed a method for operating a refuse incineration plant in which, to make the amount of heat which is generated more uniform, the supply of refuse, i.e. the movement of the metering ram, the conveying of refuse on the grate, i.e. movement or lifting frequency of the grate parts, and the supply of primary air is regulated by means of a cascaded regulating system. The quantity of steam which is generated is recorded with a slight delay and is used as the main regulating variable. The value for the oxygen content of the flue gas, which is rapidly available, is used as an auxiliary regulating variable. With this firing capacity regulation, it is possible for the refuse incineration plant to be substantially automatically matched to slightly changing properties of refuse and therefore to minor fluctuations in calorific value. However, the grate frequency, ram movement and primary air supply are always increased or reduced in the same direction. Consequently, this fire capacity regulation does not sufficiently compensate for relatively substantial changes in the condition or calorific value of the refuse which require the operating parameters to be changed in opposite directions. This is the case, for example, when switching over to wet, highly compacted refuse, in which case the ram velocity should be lowered in order to reduce the supply of refuse and the grate frequency should be increased in order to split or break up the refuse. In the known process, although the fluctuation in calorific value is compensated for in the short term by fanning or retarding the firing intensity and in the longer term by means of the metered quantity of refuse, the automatic fire capacity regulation takes no account of the correct incineration profile over the grate length.

In practice, such changes in the calorific value are usually compensated for by an operator by visual assessment of the condition of the refuse or the state of the fire. The operator then manually adjusts individual operating parameters; for example, in the case of wet refuse, the primary air preheating is often increased. A problem of this is that it is complicated to adjust the operating parameters, on account of the wide range of possible actions and interactions, and the adjustments are not always selected optimally. Furthermore, success is very dependent on the experience of the operator. The regulating process has an extremely long delay time, and consequently the full effects of an intervention can only be assessed after about an hour.

SUMMARY OF THE INVENTION

Therefore, the invention is based on the object of simplifying operation of a refuse incineration plant, in particular of providing a method for operating a refuse incineration plant in which the operating parameters are to a large extent automatically adapted to changing refuse properties, in particular fluctuations in the calorific value.

To operate a refuse incineration plant, after the fire has been fanned, the generation of heat is made more uniform (fire capacity regulation) in a manner known per se by regulating a plurality of operating parameters, including at least one of the operating parameters: refuse metering; residence time on a grate and quantitative supply of primary air, as a function of a plurality of measured variables, including at least one of the measured variables: oxygen content in the flue gas and quantity of steam generated. By way of example, the method which is known from EP-B 0 499 976 is used. According to the invention, a calorific value parameter, which is a measure of the calorific value of the metered refuse or the change in this value, is derived from a measured variable. As a modification to the known control techniques, at least one of the operating parameters is adjusted at least in part as a function of the calorific value parameter.

The calorific value or the change in this value is automatically recorded by analyzing suitable measured variables. The calorific value parameter is used to influence the regulation of at least one operating parameter in accordance with a predetermined plan which is, for example, empirically determined or drawn up using model calculations. Ideally, therefore, no manual intervention is required, but rather the intervention takes place automatically on the basis of objective criteria, and the plant can in principle be left to run itself.

In addition, it is also possible to provide the option of manual intervention. To this end, the calorific value or the change in this value is estimated by an operator, for example by observing the fire position. The process control unit is used to input as calorific value parameter a variable which indicates, for example, the extent to which the estimated calorific value deviates from the nominal calorific value assumed when dimensioning the firing installation.

The measured variable for the calorific value parameter is recorded automatically. In an advantageous refinement of the method, the moisture content of the flue gas is used as a measure for the calorific value. This is based on the fact that the calorific value of the refuse is substantially determined by its water content. Since the water contained in the refuse begins to evaporate as soon as it is fed into the furnace, the measured moisture content reproduces changes in the refuse composition without a major time delay. A corresponding signal is then immediately available in order for the operating parameters or the regulation thereof to be matched to the changed calorific value. The moisture content of the flue gas can be measured directly by means of a humidity sensor. Preferably, however, the flue gas is saturated with water, and the readily measurable temperature of the saturated flue gas is used as a measure of the moisture content and therefore of the calorific value. The extraction of heat through evaporation is greater if less water was present in the flue gas from the outset. The temperature of the water-enriched flue gas is therefore a measure of the original water content of the refuse and therefore of the calorific value. Since in many refuse incineration plants a water injection means and a scrubber are present, this variant can be implemented particularly easily. The temperature is preferably measured downstream of the water injection means, in the sump of the scrubber or at the scrubber outlet.

The calorific value parameter is used to automatically determine at least one correction variable which modifies at least one of the setting values from the fire capacity regulation and/or one of the variables used for fire capacity regulation, e.g. input variables or amplifications of regulators involved. Preferably, a plurality of operating parameters are influenced in such a way, so that, by means of an intervention or on the basis of the automatically recorded calorific value, the characteristic diagram of the entire plant can be shifted and optimally matched to the changed calorific value. Correction variables are determined, for example, on the basis of model calculations or are based on empirical values.

The correction variable is used, for example, to shift the setting range or working point of an individual regulator, while the capacity regulation otherwise keeps the heat output constant in a known way.

In a further advantageous refinement of the invention, the correction variable determined from the calorific parameter value is used to modify the regulator amplification of at least one regulator. In this way, the operating range of this regulator is adapted to the changed calorific value. In addition, corresponding correction variables determined from the same calorific value parameter can also be used to adapt the setting value and/or the desired value of this regulator or of other regulators.

Preferably, the following operating parameters are adjusted as a function of the calorific value parameter: sum of primary air and secondary air, ratio of primary air to secondary air, zone flap position, primary air, refuse metering, residence time on the grate, desired oxygen value, primary air preheating.

The regulating system according to the invention for regulating at least one of the operating parameters of a refuse incineration plant has at least one regulator which, on the basis of at least one regulating variable supplied as an input signal and/or at least one desired value, generates an output signal which is fed as a setting value to one of the actuators for the ram, grate, primary air flaps or primary air preheater. According to the invention, there is a first measuring device for recording a measured variable from which a calorific value parameter, which is a measure of the calorific value of the refuse or the change in this value, is derived. Furthermore, there is a calorific value correction unit which, on the basis of the calorific value parameter, generates at least one correction variable, which is used to modify at least one desired value and/or setting value and/or a regulator amplification of the at least one regulator.

The regulating system is used in particular to carry out the method according to the invention.

A refuse incineration plant having a regulating system of this type has all the advantages of the regulating system.

BRIEF DESCRIPTION OF THE DRAWINGS

Exemplary embodiments of the invention are illustrated in the figures and described below. In the figures.

DETAILED DESCRIPTION OF THE PREFERRED EMBODIMENTS

Figure 1:
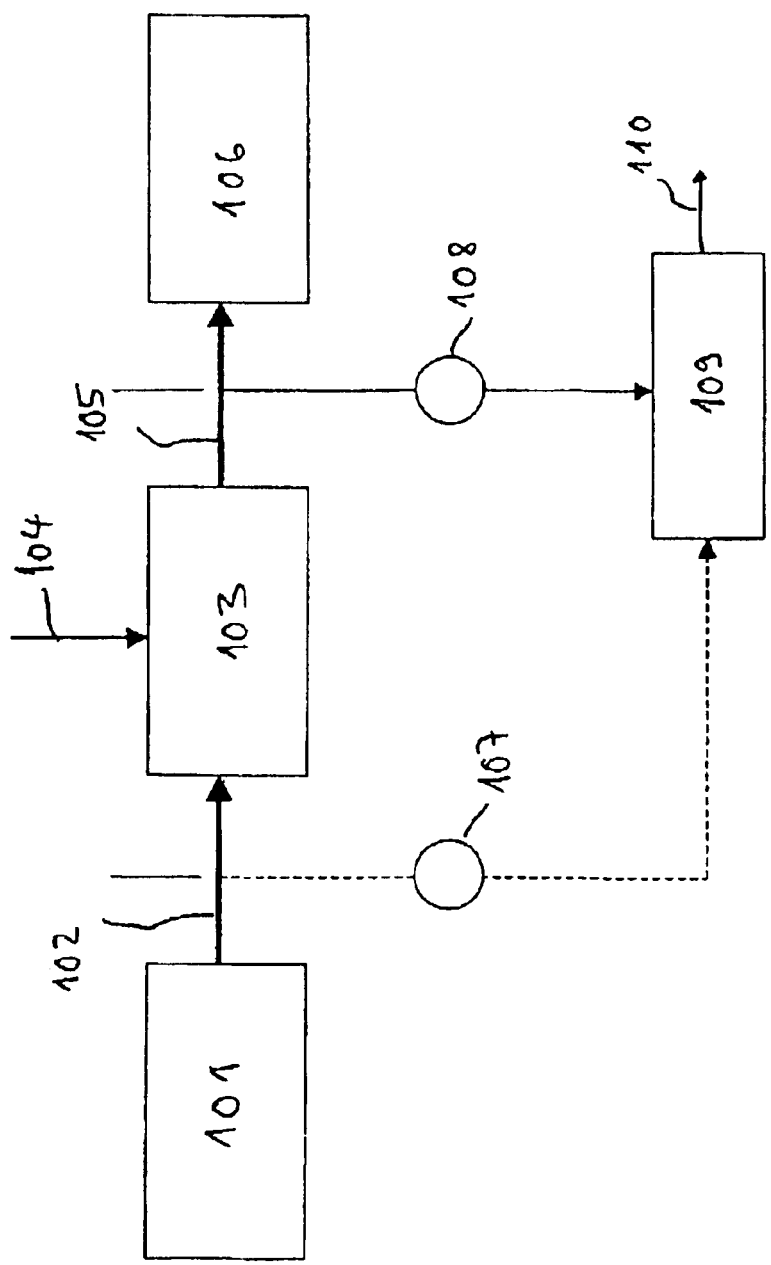
FIG. 1 diagrammatically depicts a flow diagram of a refuse incineration plant.

FIG. 1 shows a flow diagram of a refuse incineration plant. Refuse is fed to the combustion chamber 101 by means of a ram (not shown here). The refuse which is metered in passes onto a driven incineration grate (not shown here), where it is dried, degassed and incinerated. The incineration sequence is influenced by the supply of primary air, secondary air and the grate movement. The hot flue gases 102 pass from the combustion chamber 101 into a boiler (not shown here), where they are used for steam generation. The flue gas then passes through a water injection means or quench device 103, in which the flue gas 102 is saturated with water 104. The saturated flue gas 105 is then fed to the flue-gas cleaning stage 106.

A temperature-measuring device 108 measures the temperature of the water-saturated flue gas 105. The measured value is fed to a processing unit 109, which generates a calorific value parameter 110. The processing unit 109 comprises, for example, a PI regulator. By way of example, the deviation of the instantaneous temperature of the sliding temperature mean is taken as a measure of the calorific value or the calorific value deviation. The temperature of the flue gas which is used for regulation purposes may be measured downstream of the quench device 103, in the sump of the scrubber 106 or in the region of the scrubber outlet.

To determine the calorific value parameter 110, it is also possible to measure the moisture content of the unsaturated flue gas 102 using a humidity-measuring device 107 and for this measurement to be evaluated in the processing unit 109. This is recommended in particular for plants without a quench device 103.

Figure 2:
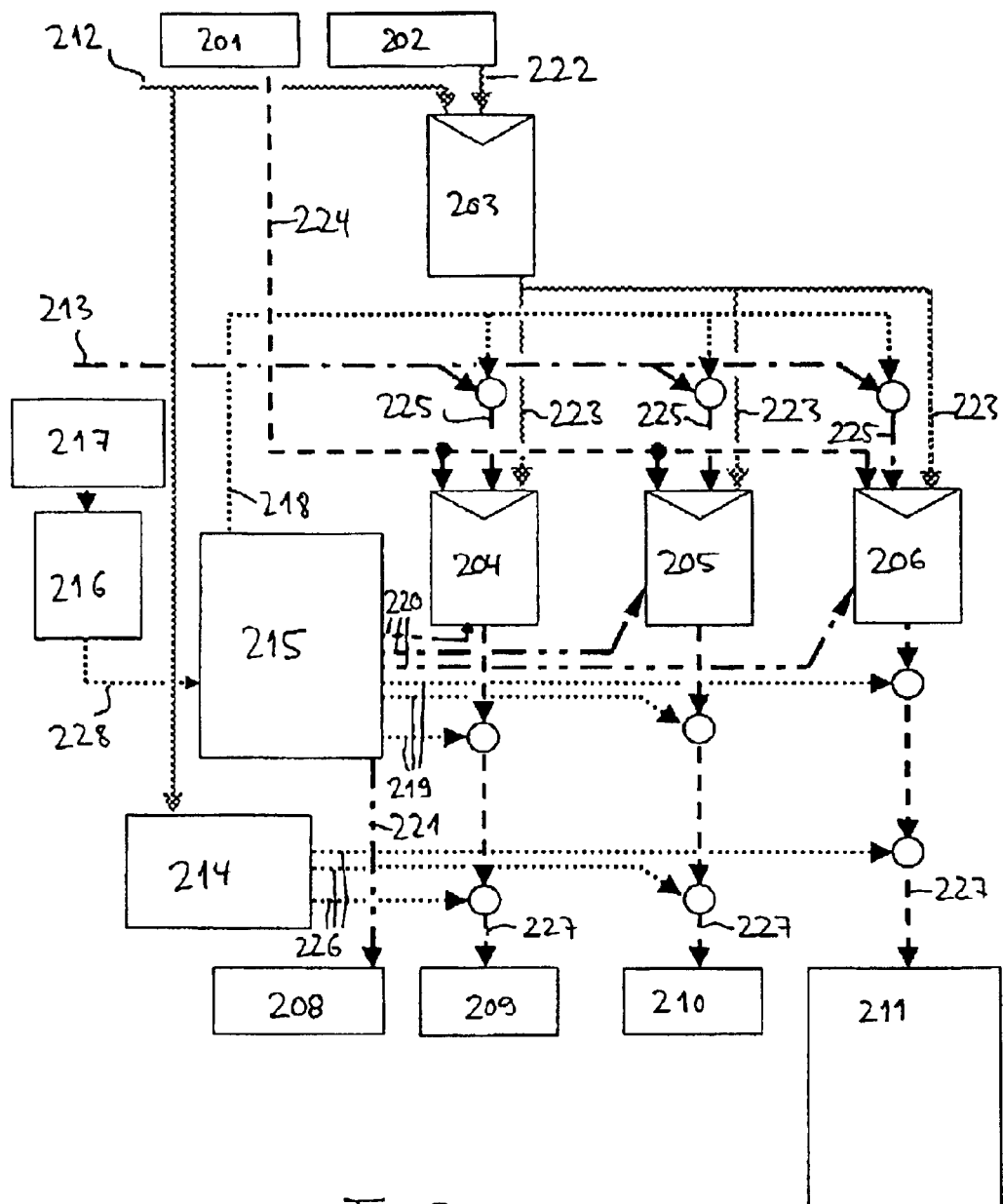
FIG. 2 diagrammatically depicts an example of a regulating means according to the invention.

In a manner which is known per se, the regulating system shown in FIG. 2 has measuring devices 201, 202 for measuring the oxygen content of the flue gas and the quantity of steam. The operating parameters are regulated as follows: refuse metering by influencing the actuator "ram" 209, residence time on the grate by influencing the actuator "grate" 210, primary air preheating by influencing the corresponding actuator 208 and further parameters of the primary and secondary air supply and distribution by influencing the functional unit "air" 211, which may include further regulators. The functional unit "air" 211 is used to influence, for example, actuators which are not shown here for the total air quantity, primary air quantity, secondary air quantity, air supply to the individual grate zones.

The measured value for the quantity of steam 222 is fed as input signal to a main or lead regulator 203. This is preferably a slow-operation PI regulator. Its output signal 223 is fed to three downstream auxiliary or servo regulators 204, 205, 206, which are preferably quick-operation P regulators. The desired value of the auxiliary regulators 204, 205, 206 is adjusted by the output signal 223 of the main regulator 203 on the basis of the measured steam values. The measured value for the oxygen content 224 is fed to the auxiliary regulators 204, 205, 206 as a further input signal. The predetermined desired value for the oxygen content 213 is used as a third input signal for all three auxiliary regulators 204, 205, 206. The outputs of the auxiliary regulators 204, 205, 206 are connected to the actuators ram, grate and air 209, 210, 211.

A control unit 214 is used to determine the basic setting of the actuators 209, 210, 211 on the basis of a predetermined desired steam value 212. Corresponding signals 226 are fed to the actuators 209, 210, 211 as basic setting values. These basic setting values are modified by the output signals from the auxiliary regulators 204, 205, 206, which are added, for example, to the basic setting values 226.

According to the invention, the control system which has been described hitherto and is known per se is expanded by a feature allowing the regulation to be automatically adapted to changing calorific values. For this purpose, there is a measuring device 217 for providing a measured variable from which a measure of the calorific value or its change can be derived, for example the temperature of the water-saturated flue gas. A calorific value parameter 228, which is fed as input variable to a calorific value correction unit 215, is generated from this measured variable in a unit 216. This correction unit uses the calorific value parameter to determine a plurality of correction variables 218, 219, 220, 221, which are used to modify the regulation of the operating parameters. Firstly, the calorific value correction unit 215 generates an oxygen desired-value correction variable 218, which is used to match the oxygen desired value 213 fed to the auxiliary regulators as input variable 225 to the changed calorific value, for example by adding the correction variable to the desired value. Setting-value correction variables 219 are used to modify the setting value 227 fed to the actuators 209, 210, 211. By way of example, the setting value 227 used is the sum of the output signal from the auxiliary regulators 204, 205, 206, the corresponding basic setting value 226 and the corresponding correction variable 219. By suitably assigning correction variables 219 to the individual actuators, it is possible, by means of a single, automatically executed intervention, to optimally match the operating parameters to the current calorific value. By way of example, in the event of a transition to wet, highly compacted refuse (lower calorific value), the ram velocity is reduced (negative correction variable for actuator ram 209) and the grate lifting frequency is increased (positive correction variable for actuator grate 210).

In a preferred refinement of the invention, the calorific value correction unit 215 generates further correction variables 220, which are used to modify the amplification of the auxiliary regulators 204, 205, 206. By way of example, at high calorific values the amplification of the auxiliary regulator 205 which regulates the actuator grate 210 is increased and the amplification of the auxiliary regulator 206 which regulates the functional unit air 211 is reduced. At the same time, the basic setting values are adapted using correction variables 219. This is based on the discovery that different refuse calorific values require different regulator responses (amplifications) for the same regulator deviation. Furthermore, the burn-off behavior of the refuse on the grate is dependent on the calorific value and therefore requires measures which ensure the optimum grate coverage for any condition of refuse (adaptation of the basic setting values). By way of example, at high calorific values the plant is preferably operated with a grate bias, i.e. with a short residence time on the grate, and at low calorific values the plant is preferably operated with an air bias. This can be achieved by modifying the regulator amplification in accordance with the invention.

The calorific value correction unit 215 generates a further control variable 221 which serves directly as a setting value for the primary air preheating actuator 208.

Figures 3A, 3B:
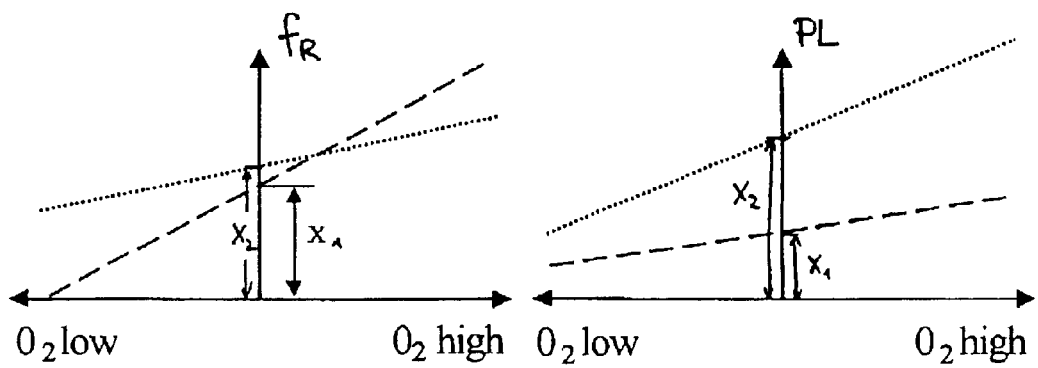
FIG. 3a diagrammatically depicts examples for characteristic curves of a servo regulator for the grate at different calorific values.
FIG. 3b diagrammatically depicts examples for characteristic curves of a servo regulator for the air supply at different calorific values.

FIGS. 3a and 3b in each case show two examples of characteristic curves of a servo regulator for the grate and for the air supply and the setting variables of the corresponding actuators for high calorific values (dashed line) and low calorific values (dotted line). FIG. 3a shows the grate lifting frequency $f_R$ as a function of the measured oxygen content or the deviation of the servo regulator. If the control deviation is zero, the setting value x1, x2 is given by the basic variable which has been determined by the control unit 214 and corrected on the basis of the recorded calorific value. Accordingly, the basic setting x1 for a high calorific value is lower than the basic setting x2 for a low calorific value. The increase in the characteristic curves is determined by the regulator amplification, which is higher for a high calorific value than for a low calorific value. In the case of the primary air supply PL, the regulation of which is illustrated in FIG. 3b, the basic setting X1, X2 and regulator amplification are lower for a high calorific value than for a low calorific value.

Figure 4:
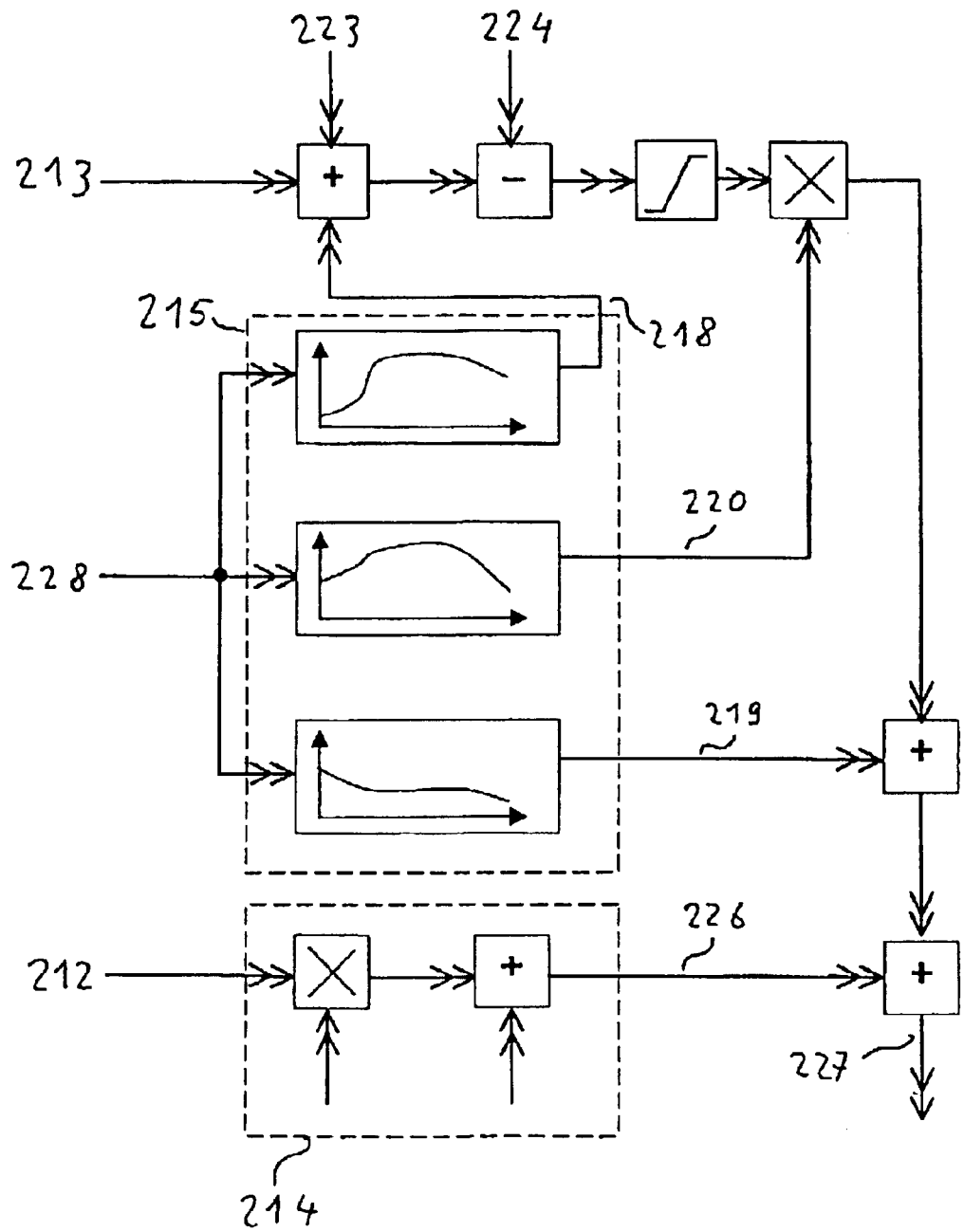
FIG. 4 diagrammatically depicts an example of a regulator circuit for the servo regulator.

FIG. 4 shows an example of a regulator circuit for the servo regulators 205 or 206 from FIG. 2. Correction variables 218, 219, 220 are generated from the calorific value parameter 228 in the calorific value correction unit 215. The association takes place on the basis of predetermined functions, which are symbolized in FIG. 4 by nonlinear curves in the unit 215. The oxygen desired value 213, with the output signal 223 from the steam regulator, which indicates the oxygen desired value shift, and the desired value correction variable 218, is fed to an adder. The difference with respect to the current oxygen measured value 224 is amplified or attenuated, the proportionality factor being determined by the regulator amplification correction variable 220. The basic variable 226 for the setting value 227 and a setting-value correction variable 219 is added to this regulator amplification correction variable 220. The basic variable 226 for the setting value 227 is generated in the control unit 214 by multiplication and addition using predetermined variables from the preset steam desired value 212. The actuator 209 or 210 is actuated using the setting value 227 generated in this way.

What is claimed is:

1. A method for operating a refuse incineration plant having a grate and a fire for making a generation of heat more uniform after the fire has been fanned, the method comprising the steps of: regulating a plurality of operating parameters, including at least one operating parameter from the group of parameters consisting of "refuse metering", "residence time on the grate" and "quantitative supply of primary air", as a function of a plurality of measured variables, including at least one measured variable from the group of variables consisting of "oxygen content in the flue gas" and "quantity of steam generated"; determining a calorific value parameter, which is a measure of the calorific value of the refuse or a change in the caloric value, from a further measured variable; and adjusting at least one of the operating parameters at least partially as a function of the calorific value parameter, the calorific value parameter being determined from the temperature of flue gas which is generated during incineration and is then saturated with steam.

2. The method as defined in claim 1, wherein the adjusting step includes adjusting at least two operating parameters from the group of parameters consisting of "sum of primary air and secondary air", "ratio of primary air to secondary air", "zone flap position", "quantity of primary air", "refuse metering", "residence time on the grate", "desired oxygen value", and "primary air preheating" as a function of the calorific value parameter.

3. The method as defined in claim 1, further comprising assigning at least one correction variable to the calorific value parameter or according to a predetermined rule, and using the correction variable for modifying at least one input variable and/or at least one output variable of at least one regulator to adjust or control the at least one operating parameter.

4. The method as defined in claim 3, wherein the step of adjusting an operating parameter includes using a sum of the output variable of the regulator, a correction variable generated based on the calorific value parameter and a predetermined basic setting value to adjust the operating parameter.

5. The method as defined in claim 3, including modifying the input variable for a regulator using a correction variable.

6. The method as defined in claim 1, further comprising assigning at least one correction variable to the calorific value parameter or according to a predetermined rule, and modifying at least the regulator amplification of at least one regulator, which is used to adjust or control the at least one operating parameter, using the correction variable.

7. The method as defined in claim 1, including regulating the operating parameters "refuse metering", "residence time on a grate", "quantitative supply of primary air" and "primary air preheating", using setting values which are derived form at least the measured variables "oxygen content in the flue gas" and "quantity of steam generated" and are modified as a function of the calorific value parameter.

8. A method for operating a refuse incineration plant having a grate and a fire for making a generation of heat more uniform after the fire has been fanned, the method comprising the steps of: regulating a plurality of operating parameters, including at least one operating parameter from the group of parameters consisting of "refuse metering", "residence time on the grate" and "quantitative supply of primary air", as a function of a plurality of measured variables, including at least one measured variable from the group of variables consisting of "oxygen content in the flue gas" and "quantity of steam generated", by using at least one regulator; determining a calorific value parameter, which is a measure of the calorific value of the refuse or a change in a caloric value, from a further measured variable; adjusting at least one of the operating parameters at least partially as a function of the calorific value parameter by generating at least one correction variable on the basis of the calorific value parameter; and modifying at least one of an input variable, an output variable and a regulator amplification of the at least one regulator.

9. The method as defined in claim 8, including determining the calorific value parameter from the moisture content of the flue gas which is generated during incineration.

10. The method as defined in claim 8, including determining the calorific value parameter from the temperature of flue gas which is generated during incineration and is then saturated with steam.

11. A regulating system for regulating at least one operating parameter of a refuse incineration plant, the system comprising: at least one regulator for regulating at least one actuator from the group of actuators consisting of ram, grate, primary air flaps and primary air quantity preheater; a measuring device for recording a measured variable, from which a calorific value parameter, which is a measure of the calorific value of refuse or a change in the calorific value, is derived; and a calorific value correction unit operative to generate at least one correction variable based on the calorific value parameter, which correction variable is used to modify at least one of an input variable, an output variable and a regulator amplification of the at least one regulator.

12. The regulating system as defined in claim 11, wherein the measuring device is operative to record one of moisture content of flue gas and temperature of water-saturated flue gas.

13. The regulating system as defined in claim 11, wherein the calorific value correction unit has a circuit operative to assign a plurality of correction variables to the calorific value parameter.

14. The regulating system as defined in claim 11, and further comprising measuring devices for measuring the quantity of steam and oxygen content of the flue gas.

15. The regulating system as defined in claim 14, and further comprising a multiloop regulating device having a main regulator, to which a main regulating variable derived from the measured quantity of steam is fed, and a least three quicker auxiliary regulators which are connected downstream of the main regulator and are fed an auxiliary regulating variable derived from the measured oxygen content, the auxiliary regulators having outputs that are in each case connected to one of the actuators, the correction variables being used to modify at least one of an input variable, an output variable and a regulator amplification of at least one of the auxiliary regulators.

16. The regulating system as defined in claim 13, wherein the circuit is a processor operative to calculate the correction variables from the calorific value parameter.

17. A refuse incineration plant comprising: a combustion chamber having a grate; a boiler; and a regulating system having at least one regulator for regulating at least one actuator from the group of actuators consisting of ram, grate, primary air flaps and primary air quantity preheater, a measuring device for recording a measured variable, from which a calorific value parameter, which is a measure of the calorific value of refuse or a change in the calorific value, is derived, and a calorific value correction unit operative to generate at least one correction variable based on the calorific value parameter, which correction variable is used to modify at least one of an input variable, an output variable and a regulator amplification of the at least one regulator.

18. The refuse incineration plant as defined in claim 17, and further comprising water injection means for saturating the flue gas generated during the refuse incineration with steam, and measuring means for measuring the temperature of the steam-saturated flue gas, which is arranged downstream of the water injection means.

19. The refuse incineration plant as defined in claim 17, and further comprising means for measuring moisture content of the flue gas.

* * * * *